UNITED STATES PATENT OFFICE 2,585,918

COMPOSITIONS COMPRISING SOLUTIONS OF ACRYLONITRILE POLYMERS

Masten Rufus Dalton, Chester, Pa., assignor to American Viscose Corporation, Wilmington, Del., a corporation of Delaware No Drawing. Application December 20, 1949, Serial No. 134,129. In Canada August 5, 1948

15 Claims. (Cl. 260—32.6)

This invention relates to new compositions comprising solutions of acrylonitrile polymers, including homopolymers, copolymers, and interpolymers containing at least 85 mole percent of acrylonitrile in the polymer molecule.

This application is a continuation-in-part of my pending application Serial No. 770,557, filed August 25, 1947, now abandoned, and, of my pending application Serial No. 73,012, filed January 26, 1949, now abandoned.

The most practical and commercially acceptable method of producing useful spinning, casting, coating, or the like solutions of polymeric materials involves the steps of dispersing the polymer, in particulate condition, in the selected solvent at ordinary or room temperature and then heating the dispersion to moderately elevated temperatures to dissolve the polymer particles.

However, considerable difficulty is experienced when it is attempted to dissolve the acrylonitrile polymers containing at least 85 mole percent of acrylonitrile in the available organic solvents such as dimethylformamide because the solvents are swelling agents for the polymer, which cannot be dispersed readily at room temperature. It has been suggested to solve the problem by chilling the solvent to 0° C. or below, prior to dispersing the polymer particles (U. S. 2,404,713) or by dispersing the particulate polymer in the presence of a gaseous acidic anhydride (U. S. 2,404,728). The disadvantages of these expedients are obvious. Moreover, the polymers are dissolved completely only at temperatures considerably above 100° C., and as high as 150° C., and in some cases gel or contract to syneresed masses if the solution is cooled to a temperature much below the high temperature at which the polymer is dissolved.

The object of the present invention is to provide a solvent for the acrylonitrile polymers in which the polymer can be dispersed at room temperature and completely dissolved in a practicable time at moderately elevated temperatures to obtain homogeneous solutions in which the polymer is retained in dissolved condition at room temperature.

In accordance with the invention, acrylonitrile polymers containing at least 85 mole percent of acrylonitrile are dispersed, at room temperature, in a binary mixture consisting of nitromethane and from 2 to 40% by volume, based on the total volume of the binary mixture, of formamide, and the dispersion is heated until dissolution of the polymer is complete. Although neither nitromethane nor formamide is a solvent for these acrylonitrile polymers, the polymers are completely dissolved in the binary mixtures of nitromethane and formamide. In order to expedite dissolution of the polymer, and effect complete dissolution thereof in a practicable length of time, usually 3 to 4 hours, it is preferable to heat the dispersion obtained at room temperature, but temperatures higher than about 115° C. are not required (increased pressure being used at temperatures above 100° C.) and in many cases, depending on the proportion of formamide in the binary mixture, complete dissolution is obtained at temperatures of 100° C. or lower, for example between 60 and 80° C. The solutions are stable, i. e., the polymer is retained in solution in the binary mixture, at room temperature for indefinite periods.

In the preferred embodiment, the binary mixture consists of nitromethane and from 2 to 10%, preferably from 2 to 5%, by volume of formamide. The clear homogeneous solutions of the polymer in binary mixtures comprising these small amounts of formamide have the special advantage that the presence of the low boiling nitromethane and of only a minimum amount of the high boiling formamide permits spinning or casting at relatively low temperatures. As shown in Example I, the solutions may be dry spun under conditions such that the air entering the spinning cell has a temperature of 145° C. Evaporation of the binary mixture at this comparatively low temperature is unexpected because formamide itself boils at 193 to 200° C., with decomposition. The temperature of the air entering the cell may be above 145° C., if desired, for example up to 200° C., but air at 145° C. is satisfactory.

The use of binary mixtures containing formamide in the lower proportions, that is, in an amount of from 2 to 10% by volume also simplifies solvent recovery.

The acrylonitrile polymer which is dissolved in the binary mixture of nitromethane and from 2 to 40% formamide, by volume, may be polyacrylonitrile, or it may be a copolymer or interpolymer, including ternary polymers, of acrylonitrile with at least one other polymerizable organic material having carbon-to-carbon unsaturation of the ethylenic type, namely, $>C=C<$. Examples of such polymerizable materials are vinyl chloride, vinyl acetate, vinyl propionate and vinyl organic acid esters generally, acrylic acid and its esters and homologues, methacrylic acid and its esters and homologs, vinyl pyridines such as 2-vinyl pyridine, 3-vinyl pyridine, 4-vinyl pyridine and alkyl substituted vinyl pyridines. The copolymers contain from 85% to 98% acrylonitrile and from 2 to 15 mole percent of said other polymerizable substance.

The following examples illustrate the invention.

EXAMPLE I

A copolymer of acrylonitrile and vinyl acetate is prepared by the following procedure as disclosed in the pending application of David W. Chaney, S. N. 51,188, filed September 25, 1948, now Patent No. 2,537,031.

(A) 18.7 parts of vinyl acetate and 82.2 parts of acrylonitrile were dissolved in 2850 parts of water and heated to 80° C. in a three-neck vessel fitted with thermometer, stirrer, reflux condenser, and dropping funnel. 12 parts of potassium persulfate dissolved in 150 parts of water were heated to 80° C. and added to the mixture. Reaction set in immediately, and the reflux temperature began to rise slowly. As soon as this occurred, continuous addition of a mixture consisting of 38.6 parts of vinyl acetate and 260.5 parts of acrylonitrile was started, the rate of the addition being such that the reflux temperature was maintained at 80° C. (atmosphere pressure) and the rate of reflux remained constant. The rate of the addition is shown in Table I below. As shown, when the reaction was 5% complete, the rate at which the monomer mixture was being added was 2.5 parts/minute. At 10% reaction the rate of addition had to be increased to 4.0 parts of the monomer mixture/minute in order to maintain the temperature at 80° C. and the rate of reflux constant. As the reaction proceeded, the rate of addition had to be increased progressively. The reaction was terminated, when all of the monomeric mixture had been added, by rapidly filtering and washing the filtrate with water. The reaction was complete in 63 minutes and the residual unreacted monomers could be recovered by the usual methods.

Samples were withdrawn at intervals, washed and dried. Each sample was analyzed for nitrogen and its specific viscosity was determined, with the results shown in Table I below.

Table I

| Rate of Addition of the Mixed Monomers, parts/min. | Percent Reaction | N Content | $CH_2CHCN$ (Mole Percent) | Specific Viscosity |
|---|---|---|---|---|
| 2.5 | 5 | 23.2 | 92.2 | .153 |
| 4.0 | 10 | 23.6 | 93.2 | .175 |
| 4.1 | 25 | 23.5 | 93.1 | .244 |
| 4.4 | 40 | 23.6 | 93.5 | .252 |
| 5.2 | 65 | 23.4 | 92.7 | .350 |
| 5.4 | 90 | 23.4 | 92.7 | .330 |
| 6.6 | 100 | | | .362 |

25 parts of the copolymer, which are shown by the table had a substantially uniform composition and molecular weight, are dispersed, in particulate form, in 75 parts of a binary mixture consisting of 95% of nitromethane and 5% of formamide, by volume, at room temperature with vigorous agitation. The particles did not ball up or coalesce in the binary mixture. The temperature of the dispersion is then raised to about 75° C., stirring being continued, and agitated at that temperature for about 4 hours. A clear colorless solution containing the polymer in a concentration of 25% is obtained.

EXAMPLE II

The acrylonitrile-vinyl acetate copolymer of Example I is dissolved in a binary mixture consisting of 98% of nitromethane and 2% of formamide by volume, to give a solution of 15% concentration. Other conditions are the same as those recited in Example I.

EXAMPLE III 7 parts of a copolymer of acrylonitrile and vinyl acetate prepared by the procedure of Example I but containing 97-98 mole per cent of acrylonitrile in the molecule are dispersed in 93 parts of a binary mixture consisting of 92% of nitromethane and 8% of formamide, by volume, at room temperature, with vigorous agitation. The temperature of the dispersion is raised to about 80° C., agitation being continued, and the mass is agitated at that temperature for about four hours until dissolution of the copolymer is complete.

EXAMPLE IV 8 parts of a copolymer of acrylonitrile and styrene containing 90 mole per cent of acrylonitrile in the copolymer molecule are dispersed in 92 parts of a binary mixture consisting of 96% nitromethane and 4% formamide, by volume, at room temperature, with vigorous agitation. The temperature of the dispersion is then raised to about 75° C., stirring being continued, and stirred at that temperature for 4 hours, until the copolymer is dissolved.

EXAMPLE V 7 parts of a copolymer of acrylonitrile and isobutylene containing 90±0.5 mole per cent acrylonitrile and 10±0.5 mole per cent isobutylene are dispersed in 93 parts of a binary mixture consisting of 95% nitromethane and 4% formamide, by volume, at room temperature, with vigorous agitation. The temperature is then raised to about 75° C., stirring being continued at that temperature for about 4 hours, to complete the dissolution.

EXAMPLE VI

A copolymer of acrylonitrile and styrene is prepared by the following solution polymerization process as disclosed in the Chaney application supra.

(A) 0.93 part of styrene and 85.7 parts of acrylonitrile were dissolved in 3400 parts of water and heated to 85° C. in a three-neck vessel fitted with thermometer, stirrer, reflux condenser, and dropping funnel. 10.5 parts of potassium persulfate were dissolved in 100 parts of water and added to the contents of the vessel. Polymerization set in immediately, and the reflux temperature began to rise. The continuous addition of a mixture consisting of 75 parts of styrene and 345 parts of acrylonitrile was started immediately to prevent increase in the reflux temperature, the mixture being added at a rate sufficient to maintain the reflux temperature at 85° C. (atmospheric pressure), and the rate of reflux constant.

The reaction was terminated when all of the monomer mixture had been added as described in method A, Example I, above. Time: 48 min.

Table I

| Rate of Addition of the Mixed Monomers, parts/min. | Percent Reaction | N Content | $CH_2CHCN$ (Mole Percent) | Specific Viscosity |
|---|---|---|---|---|
| 8.3 | 15 | 20.6 | 87.3 | |
| 8.6 | 28 | 21.1 | 88.5 | .357 |
| 8.8 | 53 | 20.9 | 88.0 | .339 |
| 8.5 | 69 | 21.0 | 88.3 | .364 |
| 9.4 | 100 | 21.4 | 89.2 | .394 |

7 parts of the copolymer which as shown by the table had a substantially uniform composition and molecular weight, are dissolved in 93 parts of a binary mixture consisting of 98% nitromethane and 2% formamide, by volume, at room temperature, with vigorous agitation. The temperature is raised to about 75° C. and stirring is continued at that temperature for about 4 hours.

EXAMPLE VII

The solution of Example I is extruded at a rate of 7.8 gms./min. and at a temperature of 65° C. downwardly through a spinneret having 20 holes 4.5 mil in diameter, into a tubular cell through which heated air is circulated in an upward direction. The fresh air enters the lower portion of the chamber at a temperature of about 145° C., while the waste air leaving the upper portion of the cell is at a temperature of about 105° C. At the temperature stated, the nitromethane is evaporated, and an appreciable amount of the formamide, which boils at higher temperature, is evaporated. The length of the cell is 12 ft., and sufficient of the binary mixture is removed from the thread passing through the cell to result in the solidification necessary to enable the thread leaving the cell to be handled. The solidified copolymer yarn emerging at the bottom of the cell is collected at a speed of about 40 yards/minute, and then stretched up to 800% in one or more stages under heating to effect orientation with increase in tenacity. The stretched oriented yarn is then relaxed under heating whereby the elongation is improved. The yarn, which at some stage of the spinning process is washed free of residual spinning solvent, has a dry tenacity of 4 gms./denier and an elongation in the dry state of 21%.

EXAMPLE VIII

The 15% solution of the copolymer containing 98% acrylonitrile, 8% vinyl acetate in the binary mixture consisting of 95% nitromethane and 5% formamide, by volume (Ex. II), is wet spun by extruding it at a rate of 6 gms./minute through a spinneret having 20 moles 4.5 mil in diameter, into alcohol at room temperature. The resulting yarn is withdrawn from the bath and collected. This yarn is then stretched up to 800% in one or more stages under heating and the oriented yarn thus obtained is then relaxed under heating. The yarn is washed free of spinning solvent at some stage of the spinning.

EXAMPLE IX 15 parts of a copolymer containing 90 mole per cent of acrylonitrile and 10 mole per cent of 2-vinyl pyridine in the molecule are dispersed in 85 parts of a binary mixture consisting of 91% nitromethane, 9% formamide by volume at room temperature, with vigorous agitation. The temperature is then raised to about 98° C., stirring being continued at that temperature for about 4 hours, to complete the dissolution.

EXAMPLE X 15 parts of a copolymer containing 95 mole per cent of acrylonitrile and 5 mole per cent of 2-vinyl pyridine in the molecule are dispersed in 85 parts of a binary mixture consisting of 91% nitromethane, 9% formamide by volume at room temperature, with vigorous agitation. The temperature is then raised to about 98° C., stirring being continued at that temperature for about 4 hours, to complete the dissolution.

EXAMPLE XI 7 parts of polyacrylonitrile are dispersed in 93 parts of a binary mixture consisting of 92% nitromethane, 8% formamide, by volume, at room temperature, with vigorous agitation. The temperature is then raised to 115° C., with increase in the pressure, the stirring being continued at the elevated temperature for about 4 hours, to complete the dissolution.

EXAMPLE XII 8 parts of a copolymer of acrylonitrile and isobutene containing, by weight in the polymer molecule, 95% acrylonitrile and 5% isobutene in the form of particles of 20 mesh, were dispersed in a binary mixture consisting of 10 volume per cent formamide and 90 volume per cent of nitromethane, at room temperature. The temperature of the dispersion was then raised to 60° C., and upon continued stirring for about 2½ hours, a clear homogeneous 8% solution of the copolymer was obtained.

EXAMPLE XIII 7 parts of polyacrylonitrile were dispersed in a binary mixture consisting of 10 volume per cent formamide and 90 volume per cent nitromethane, at room temperature. The temperature of the dispersion was then elevated to between 55 and 65° C. The polymer began to go into solution at about 55° C., and after stirring for 5 hours, solution was complete. The resulting solution was clear, substantially colorless, and homogeneous.

The evaporative medium employed in the dry spinning of filaments and yarns or the dry casting of films in accordance with this invention may be any vapor inert to the spinning or casting solution such as air, nitrogen, steam, etc. or any suitable mixture thereof. As shown by Example VIII, the solution of the acrylonitrile polymer in binary mixtures consisting of nitromethane and from at least 2% to 40% and preferably from at least 2 to 10% of formamide by volume, can also be formed into shaped articles by extruding the solution into a suitable precipitating bath comprising a liquid that is miscible with the solvent but is a chemically inert non-solvent for the polymer.

Examples of liquids which may be used as precipitants in the wet-spinning or casting of the solutions are n-amyl alcohol, sec-amyl alcohol, n-butyl alcohol, sec-butyl alcohol, etc.

As is obvious from Examples I and VI, the binary mixtures of the invention may be used as solvent for acrylonitrile copolymers such as are described in the pending application of David W. Chaney referred to and which are of substantially uniform composition and molecular weight throughout as contrasted to the mixtures of high and low polymers generally obtained by conventional polymerization procedures. As disclosed in the Chaney application, and Examples I and VI supra, the copolymers of substantial uniformity with respect to their molecular weight and composition are produced by conducting the copolymerization of the monomers in solution under reflux, and adding the monomers, in admixture, to the copolymerization solution at a rate which is continuously correlated with the temperature and rate of reflux to maintain both the temperature and rate of reflux substantially constant from the beginning to the end of the copolymerization. The binary mixtures containing at least 2% up to 5% of formamide by volume are particularly suitable for use as solvents for such homogeneous copolymers. However, the binary mixtures generally are useful as solvents for the acrylonitrile copolymers and interpolymers prepared by any of the conventional copolymerization procedures.

The solutions of the invention are homogeneous and substantially colorless. They may be formed into fibers, as shown, or they may be used as lacquers or coating compositions, for the production of films, sheets, rods, tubings, casings, and containers for various substances including corrosive liquids, oils, greases, etc.

Various changes and modifications can be made in the above-described details without departing from the spirit of the invention, and it is to be understood that the invention is not to be limited except as defined by the appended claims.

I claim:

1. As a new composition of matter, an acrylonitrile polymer containing, in the polymer molecule, at least 85 mole per cent of acrylonitrile, dissolved in a mixture of nitromethane and from 2 to 40% of formamide by volume, based on the total volume of said mixture.

2. As a new composition of matter, an acrylonitrile polymer containing, in the polymer molecule, at least 85 mole per cent of acrylonitrile, dissolved in a mixture of nitromethane and from 2 to 10% of formamide by volume, based on the total volume of said mixture.

3. As a new composition of matter, an acrylonitrile polymer containing, in the polymer molecule, at least 85 mole per cent acrylonitrile, dissolved in a mixture of nitromethane and 5% of formamide by volume, based on the total volume of said mixture.

4. As a new composition of matter, a copolymer containing, in the polymer molecule, from 85 to 98 mole per cent of acrylonitrile and from 2 to 15 mole per cent of vinyl acetate, dissolved in a mixture of nitromethane and from 2 to 40% of formamide by volume, based on the total volume of said mixture.

5. As a new composition of matter, a copolymer containing, in the polymer molecule, about 92–93 mole per cent acrylonitrile and about 7–8 mole per cent of vinyl acetate, dissolved in a mixture of nitromethane and from 2 to 10% of formamide by volume, based on the total volume of said mixture.

6. As a new composition of matter, a copolymer of acrylonitrile and vinyl acetate having a substantially uniform molecular weight and composition and containing about 92–93 mole per cent of acrylonitrile in the polymer molecule dissolved in a mixture of nitromethane and 5% of formamide by volume, based on the total volume of said mixture.

7. As a new composition of matter, a copolymer of acrylonitrile and vinyl acetate having a substantially uniform molecular weight and composition and containing about 92–93 mole per cent of acrylonitrile in the polymer molecule dissolved in a binary mixture consisting of nitromethane and 2% of formamide by volume, based on the total volume of said mixture.

8. As a new composition of matter, a copolymer of acrylonitrile and stryrene containing, in the polymer molecule, from 85 to 98 mole per cent of acrylonitrile dissolved in a mixture of nitromethane and from 2 to 40% of formamide by volume, based on the total volume of said mixture.

9. As a new composition of matter, a copolymer of acrylonitrile and styrene having a substantially uniform molecular weight and composition and containing about 89 mole per cent of acrylonitrile in the polymer molecule dissolved in a binary mixture consisting of nitromethane and from 2 to 10% of formamide by volume, based on the total volume of said mixture.

10. As a new composition of matter a copolymer of acrylonitrile and styrene having a substantially uniform molecular weight and composition and containing about 89 mole per cent of acrylonitrile in the copolymer molecule dissolved in a mixture of nitromethane and 5% of formamide by volume, based on the total volume of said mixture.

11. As a new composition of matter, a copolymer of acrylonitrise and isobutylene containing from 89.5 to 90.5 mole per cent acrylonitrile in the polymer molecule dissolved in a mixture of nitromethane and from 2 to 40% of formamide by volume, based on the total volume of said mixture.

12. As a new composition of matter, a copolymer of acrylonitrile and isobutylene containing from 89.5 to 90.5 mole per cent of acrylonitrile in the copolymer molecule dissolved in a mixture of nitromethane and from 2 to 10% of formamide by volume, based on the total volume of said mixture.

13. As a new composition of matter, a dispersion comprising a copolymer containing, in the polymer molecule, from 85 to 98 mole per cent acrylonitrile and from 2 to 15 mole per cent of a vinyl pyridine, dissolved in a mixture of nitromethane and from 2 to 40% of formamide by volume, based on the total volume of said mixture.

14. As a new composition of matter, a dispersion comprising a copolymer containing, in the polymer molecule, from 85 to 98 mole per cent acrylonitrile and from 2 to 15 mole per cent of 2-vinyl pyridine, dissolved in a mixture of nitromethane and from 2 to 40% of formamide by volume, based on the total volume of said mixture.

15. The method of preparing substantially colorless and homogeneous solutions of acrylonitrile polymers containing, in the polymer molecule, up to 15 mole per cent of another polymerizable substance containing from 1 to 2 ethylenic linkages, which comprises dispersing the polymers, in particulate form, at room temperature, in a mixture consisting of nitromethane and from 2 to 40% of formamide by volume, based on the total volume of the mixture, and heating the dispersion, with agitation until dissolution of the polymer is complete.

MASTEN RUFUS DALTON.

REFERENCES CITED

The following references are of record in the file of this patent:

UNITED STATES PATENTS

| Number | Name | Date |
|---|---|---|
| 2,404,714 | Latham | July 23, 1946 |
| 2,404,725 | Rogers | July 23, 1946 |